(12) United States Patent
Yoshimura et al.

(10) Patent No.: US 7,392,385 B2
(45) Date of Patent: Jun. 24, 2008

(54) CLIENT SERVER SYSTEM AND DEVICES THEREOF

(75) Inventors: Koichi Yoshimura, Kanagawa (JP); Kohshiro Inomata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 807 days.

(21) Appl. No.: 10/397,871

(22) Filed: Mar. 27, 2003

(65) Prior Publication Data
US 2004/0025020 A1  Feb. 5, 2004

(30) Foreign Application Priority Data
Jul. 30, 2002  (JP) ............................ P.2002-220621

(51) Int. Cl.
 *H04L 9/00* (2006.01)
 *H04L 9/32* (2006.01)
(52) U.S. Cl. .................. 713/168; 713/170; 713/189
(58) Field of Classification Search .................. 380/51, 380/55; 713/161, 168, 170, 189; 726/2
See application file for complete search history.

(56) References Cited

U.S. PATENT DOCUMENTS

| | | | |
|---|---|---|---|
| 6,378,070 B1 * | 4/2002 | Chan et al. | 713/155 |
| 6,385,728 B1 * | 5/2002 | DeBry | 726/9 |
| 6,711,677 B1 * | 3/2004 | Wiegley | 713/151 |
| 7,003,667 B1 * | 2/2006 | Slick et al. | 713/182 |

FOREIGN PATENT DOCUMENTS

| | | |
|---|---|---|
| JP | A-09-293036 | 11/1997 |
| JP | A-049766 | 2/2000 |
| JP | A-092046 | 3/2000 |
| JP | A 2001-101054 | 4/2001 |

\* cited by examiner

*Primary Examiner*—Hosuk Song
(74) *Attorney, Agent, or Firm*—Oliff & Berridge, PLC

(57) ABSTRACT

A client server system and devices thereof, which perform a distributed processing while performing access control. when a client device demands a job of the server device, the server device outputs an authentication demand message to an authentication server via a network. The authentication device performs authentication of a user taking account of an effective range of authentication information and effective dates and returns results of authentication to the server device via the network. The server device implements the demanded job in accordance with the results of authentication.

13 Claims, 13 Drawing Sheets

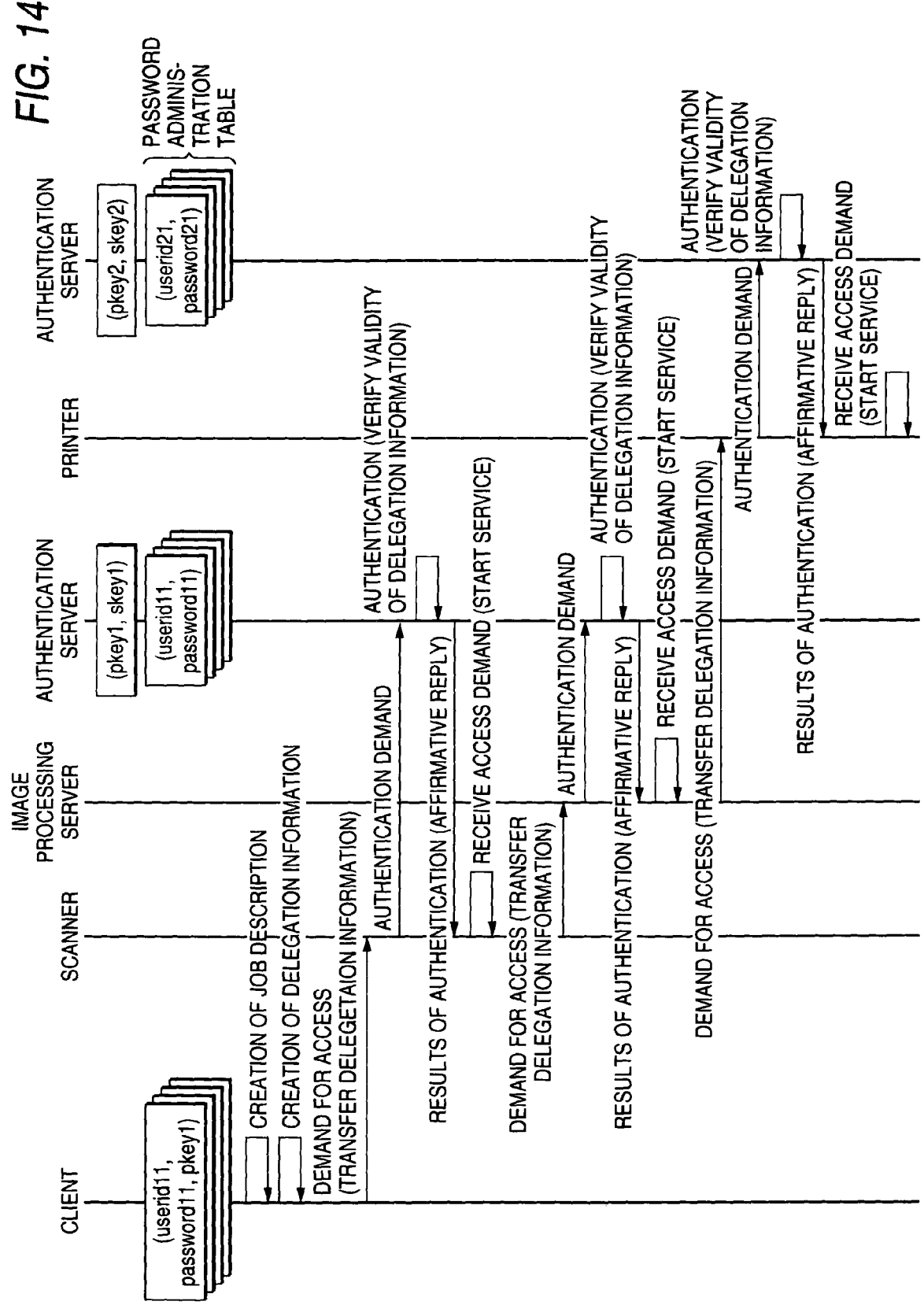

CLIENT SERVER SYSTEM AND DEVICES THEREOF

BACKGROUND OF THE INVENTION

1. Field of the Invention

The present invention relates to a client server system, which performs a distributed processing while performing access control, and devices thereof.

2. Background Art

Client server systems are generally utilized, in which client devices demand predetermined processings of server devices via networks to cause the server devices to implement the processings.

In the case where a client device has access to a server device to cause the same to implement a printing processing, or the like, access control by means of a password is required because cost for sheets/maintenance, or the like is generated.

For example, JP-A-2001-101054 (document 1) discloses a method of using a capability describing access authority with respect to objects such as files, or the like, in a distributed computing environment for the above access control.

When the method disclosed in the document 1 is used to deliver a capability to a third person to permit the third person to select objects, however, a client must deliver all capabilities to the third person, so that secrecy is difficult to observe.

SUMMARY OF THE INVENTION

The present invention has been thought of in view of the above background and has its object to provide a client server system, which facilitates observance of secrecy of information representative of a user's access authority, and its devices.

To attain the above object, the invention provides a client server system, wherein one or more server devices, one or more client devices, and one or more authentication devices, respectively, corresponding to one or more of the server devices are connected to one another, and wherein encryption keys used for encryption of data and decryption keys used for decryption of the encrypted data correspond to the respective server devices, and authentication information for authentication when processings are demanded of the respective server devices corresponds to the respective client devices or respective users thereof, the respective server devices receive demands for predetermined processings, containing the authentication information, which has been encrypted by means of the encryption keys, from the respective client devices, use the encrypted authentication information contained in the demands for the predetermined processings to demand authentication from those client devices, which have demanded for the predetermined processings, of the corresponding authentication devices, and implement those predetermined processings demanded by those client devices, which have been authenticated by the authentication devices, the respective client devices use the encryption keys to encrypt authentication information for the respective server devices and use the encrypted authentication information to demand predetermined processings of the respective server devices, and the respective authentication devices receive respective demands of authentication from the client devices, from the respective corresponding server devices and use the decryption keys to decrypt the encrypted authentication information contained in the demands of authentication from the client devices to authenticate those client devices, which have demanded for the predetermined processings, or users thereof on the basis of the decrypted authentication information to return respective results of authentication to the respective client devices, which have demanded for the authentication.

Preferably, the respective client devices use the encryption keys to encrypt validity information used for confirmation of the authentication information and validity of the authentication information, and use the authentication information and validity information, which have been encrypted, to demand predetermined processings of the respective server devices, the respective server devices use the encrypted authentication information and the encrypted validity information contained in the demands for the predetermined processings to demand authentication from those client devices, which have demanded for the predetermined processings, of the corresponding authentication devices, and implement the predetermined processings demanded by those client devices, which have been authenticated by the authentication devices, and the respective authentication devices receive respective demands of authentication from the client devices, from the respective corresponding server devices and use the decryption keys to decrypt the encrypted authentication information and the encrypted validity information, respectively, contained in respective demands of authentication from the client devices to confirm respective validities of the decrypted authentication information on the basis of the respective decrypted validity information and to authenticate those client devices, which have demanded for the predetermined processings, or users thereof on the basis of the respective authentication information, of which validity has been confirmed, to return respective results of authentication to the respective server devices, which have demanded for the authentication.

Preferably, predetermined jobs demanded of the respective server devices by the respective client devices contain hash values of job content information indicative of contents of the jobs, and the authentication devices implement authentication with the use of the hash values of the job content information.

Preferably, the validity information contains information indicative of effective terms and effective ranges, or either of the both of the authentication information. "Server device/client device/authentication device"

Also, server devices, client devices, and authentication devices, according to the invention, are server devices, client devices, and authentication devices, which constitute any one of the client server systems.

Processing Method

Also, the invention provides a processing method in a client server system, in which system one or more server devices, one or more client devices, and one or more authentication devices, respectively, corresponding to one or more of the server devices are connected to one another, in which method encryption keys used for encryption of data and decryption keys used for decryption of the encrypted data correspond to the respective server devices, and authentication information for authentication when processings are demanded of the respective server devices corresponds to the respective client devices or respective users thereof, the respective server devices receive demands for predetermined processings, containing the authentication information, which has been encrypted by means of the encryption keys, from the respective client devices, use the encrypted authentication information contained in the demands for the predetermined processings to demand authentication from those client devices, which have demanded for the predetermined processings, of the corresponding authentication devices, and implement those predetermined processings demanded by those client devices, which have been authenticated by the authentication devices, the respective client devices use the encryption keys to encrypt authentication information for the respective server devices and use the encrypted authentication information to demand predetermined processings of the respective server devices, and the respective authentication devices receive respective demands of authentication from the client devices, from the respective corresponding server devices and use the decryption keys to decrypt the encrypted authentication information contained in the demands of authentication from the client devices to authenticate those client devices, which have demanded for the predetermined processings, or users thereof on the basis of the decrypted authentication information to return respective results of authentication to the respective client devices, which have demanded for the authentication.

Processing Method

Also, the invention provides an authentication method in an authentication device corresponding to one or more of server devices to receive predetermined processings from client devices, wherein encryption keys used for encryption of data and decryption keys used for decryption of the encrypted data correspond to the respective server devices, and authentication information for authentication when processings are demanded of the respective server devices corresponds to the client devices or users thereof, respectively, the respective server devices receive demands for predetermined processings, containing the authentication information, which has been encrypted by means of the encryption keys, from the respective client devices, use the encrypted authentication information to demand authentication from those client devices, which have demanded for the predetermined processings, of the authentication device, and implement those predetermined processings demanded by those client devices, which have been authenticated by the authentication device, and the respective client devices use the encryption keys to encrypt authentication information for the respective server devices and use the encrypted authentication information to demand predetermined processings of the respective server devices, and wherein the encrypted authentication information contained in the demands of authentication from the client devices is decrypted by means of the decryption keys, those client devices, which have demanded for the predetermined processings, or users thereof are authenticated on the basis of the decrypted authentication information, and demands of authentication from the client devices are received from the respective server devices, and respective results of authentication are returned to the respective client devices, which have demanded for the authentication.

Processing Implementing Method

Also, the invention provides a processing implementing method in a server device to receive demands for predetermined processings from respective one or more client devices, wherein one or more authentication devices, encryption keys used for encryption of data, and decryption keys used for decryption of the encrypted data correspond to the server device, and authentication information for authentication when processings are demanded of the server device corresponds to the respective client devices or respective users thereof, and the respective client devices use the encryption keys to encrypt authentication information for the server device and use the encrypted authentication information to demand predetermined processings of the server device, and the respective authentication devices receive demands of authentication from the server device and use the decryption keys to decrypt the encrypted authentication information contained in the demands of authentication from the server device to authenticate those client devices, which have demanded for the predetermined processings, or users thereof on the basis of the decrypted authentication information to return respective results of authentication to the server device, which has demanded for the authentication, and wherein demands for the predetermined processings containing the authentication information, which has been encrypted by means of the encryption keys, are received from the respective client devices, the encrypted authentication information is used to demand authentication from those client devices, which have demanded for the predetermined processings, of any one of the corresponding authentication devices, and the predetermined processings demanded from those client devices, which have been authenticated by any one of the authentication devices, are implemented.

Processing Demanding Method

Also, the invention provides a processing demanding method in a client device to demand predetermined processings of respective one or more server devices, wherein one or more authentication devices, encryption keys used for encryption of data, and decryption keys used for decryption of the encrypted data correspond to the respective server devices, and authentication information for authentication when processings are demanded of the respective server devices corresponds to the client device or a user thereof, and the respective server devices receive demands for predetermined processings, containing the authentication information, which has been encrypted by means of the encryption keys, from the client device, use the encrypted authentication information to demand authentication from the client device, which has demanded for the predetermined processings, of any one of the corresponding authentication devices, and implement those predetermined processings demanded by the client device, which has been authenticated by any one of the authentication devices, the authentication device receives demands of authentication from the server devices and use the decryption keys to decrypt the encrypted authentication information contained in the demands of authentication from the server devices to authenticate the client device, which has demanded for the predetermined processings, or a user thereof on the basis of the decrypted authentication information to return results of the authentication to the server devices, which have demanded for the authentication, and wherein the encryption keys are used to encrypt authentication information for the server devices, and the encrypted authentication information is used to demand predetermined processings of the server devices.

First Program

Also, the invention provides a first program in a client server system, in which one or more server devices, one or more client devices, and one or more authentication devices, respectively, corresponding to one or more of the server devices are connected to one another, and encryption keys used for encryption of data and decryption keys used for decryption of the encrypted data correspond to the respective server devices, and authentication information for authentication when jobs are demanded of the respective server devices correspond to the respective client devices or respective users thereof, the program having a computer implementing in the respective server devices the steps of receiving demands for predetermined processings, containing the authentication information, which has been encrypted by means of the encryption keys, from the respective client devices, using the encrypted authentication information contained in the demands for the predetermined processings to demand authentication from those client devices, which have demanded for the predetermined processings, of the corresponding authentication devices, and implementing those predetermined processings demanded by those client devices, which have been authenticated by the authentication devices, the program having a computer implementing in the respective client devices the steps of using the encryption keys to encrypt authentication information for the respective server devices, and using the encrypted authentication information to demand predetermined processings of the respective server devices, and the program having a computer implementing in the respective authentication devices the steps of receiving respective demands of authentication from the client devices, from the respective corresponding server devices, using the decryption keys to decrypt the encrypted authentication information contained in the demands of authentication from the client devices, authenticating those respective client devices, which have demanded for the predetermined processings, on the basis of the decrypted authentication information, and returning respective results of authentication to the respective client devices, which have demanded for the authentication.

Second Program

Also, the invention provides a second program in an authentication device corresponding to one or more server devices to receive respective predetermined processings from client devices, in which encryption keys used for encryption of data and decryption keys used for decryption of the encrypted data correspond to respective server devices, authentication information for authentication when processings are demanded of the respective server devices corresponds to the respective client devices or respective users thereof, the respective server devices receive demands for predetermined processings, containing the authentication information, which has been encrypted by means of the encryption keys, from the respective client devices, use the encrypted authentication information to demand authentication from those client devices, which have demanded for the predetermined processings, of the authentication devices, and implement those predetermined processings demanded by those client devices, which have been authenticated by the authentication devices, and the respective client devices use the encryption keys to encrypt authentication information for the respective server devices and use the encrypted authentication information to demand predetermined processings of the respective server devices, the program having a computer implementing the steps of using the decryption keys to decrypt the encrypted authentication information contained in the respective demands of authentication from the respective server devices, authenticating those client devices, which have demanded for the predetermined processings, on the basis of the decrypted authentication information, and receiving demands of authentication from the client devices, from the respective server devices to return respective results of authentication to the respective server devices, which have demanded for the authentication.

Third Program

Also, the invention provides a third program in a server device to receive predetermined processings from respective one or more client devices, in which one or more authentication devices, encryption keys used for encryption of data, and decryption keys used for decryption of the encrypted data correspond to the server device, authentication information for authentication when processings are demanded of the server device corresponds to the respective client devices or respective users thereof, the respective client devices use the encryption keys to encrypt authentication information for the server device and use the encrypted authentication information to demand predetermined processings of the server device, and the respective authentication devices receive demands of authentication from the server device and use the decryption keys to decrypt the encrypted authentication information contained in the demands of authentication from the server device to authenticate those client devices, which have demanded for the predetermined processings, or users thereof on the basis of the decrypted authentication information to return respective results of authentication to the server device, which has demanded for the authentication, the program having a computer implementing the steps of receiving demands for predetermined processings, containing the authentication information, which has been encrypted by means of the encryption keys, from the respective client devices, using the encrypted authentication information to demand authentication from those client devices, which have demanded for the predetermined processings, any one of the corresponding authentication devices, and implementing those predetermined processings demanded by those client devices, which have been authenticated by any one of the authentication devices.

Fourth Program

Also, the invention provides a fourth program in a client device to demand predetermined processings of respective one or more server devices, in which one or more authentication devices, encryption keys used for encryption of data, and decryption keys used for decryption of the encrypted data correspond to the respective server devices, authentication information for authentication when processings are demanded of the respective server devices corresponds to the client device or a user thereof, the respective server devices receive demands for predetermined processings, containing the authentication information, which has been encrypted by means of the encryption keys, from the client device, use the encrypted authentication information to demand authentication from the client devices, which has demanded for the predetermined processings, of any one of the corresponding authentication devices, and implement those predetermined processings demanded by the client device, which has been authenticated by any one of the authentication devices, and the authentication devices receive demands of authentication from the server devices and use the decryption keys to decrypt the encrypted authentication information contained in the demands of authentication from the server devices to authenticate the client devices, which has demanded for the predetermined processings, or users thereof on the basis of the decrypted authentication information to return respective results of the authentication to the server devices, which have demanded for the authentication, the program having a computer implementing the steps of encrypting authentication information for the server devices with the use of the encryption keys, and using the encrypted authentication information to demand predetermined processings of the server devices.

Recording Medium

The invention further provides recording mediums for storing the first to the fourth programs as mentioned above.

BRIEF DESCRIPTION OF THE DRAWINGS

The present invention may be more readily described with reference to the accompanying drawings, in which:

FIG. 14 is a view showing a communication sequence among a client device 3, a scanner and an image processing server (server devices 22-3, 22-4), first authentication server 4-3, printer (server device 22-1), and a second authentication server 4-1, shown in FIGS. 1 and 13.

DETAILED DESCRIPTION OF THE PREFERRED EMBODIMENTS

Figure 1:
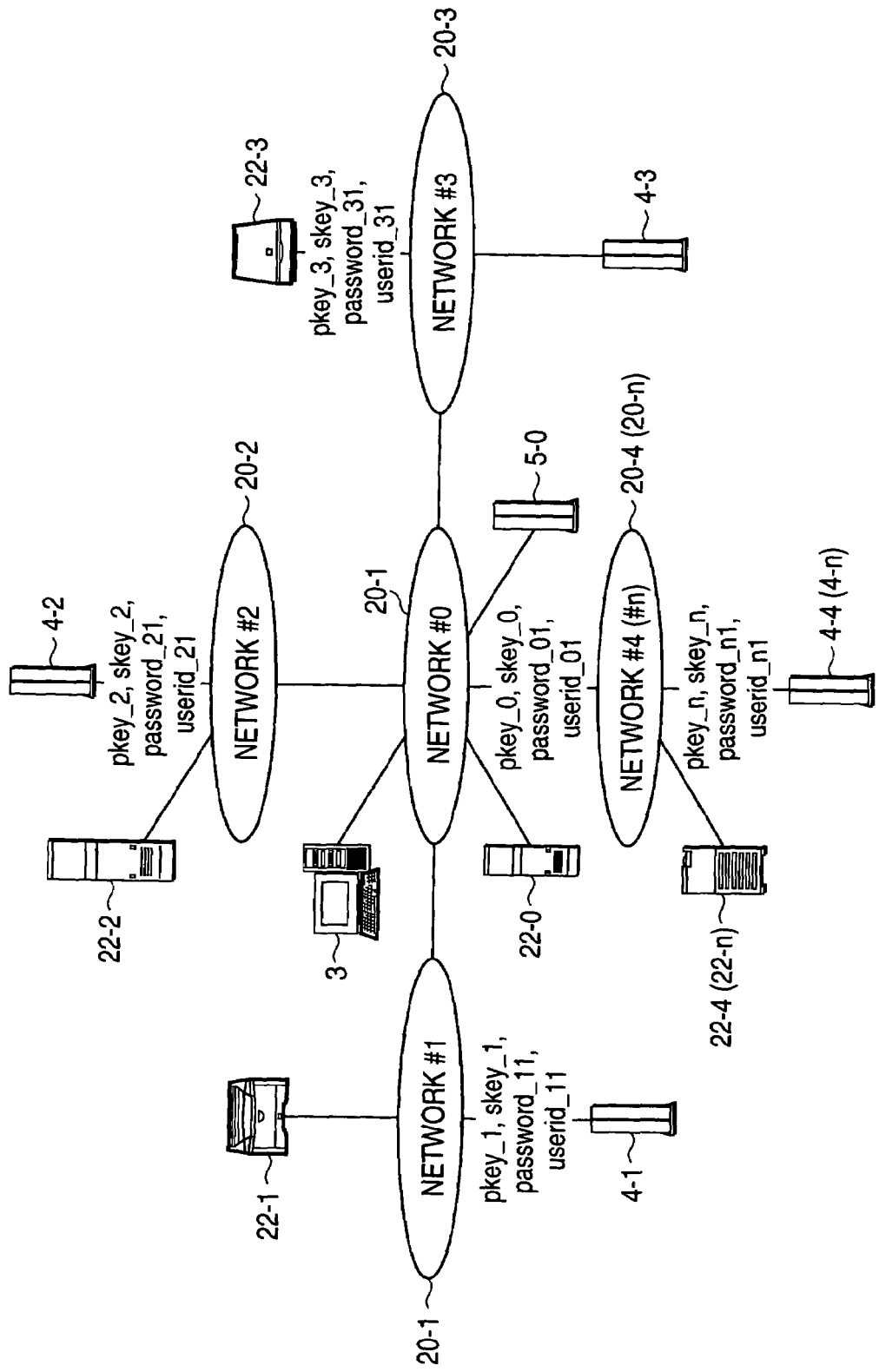
FIG. 1 is a view showing a configuration of a network system, to which an authentication method according to the invention is adapted.

First, in order to assist understanding of the invention, an explanation will be given to that background, which breeds the invention.

A server device for performing a processing demanded via network and imposing a fee generally performs access control determining every user whether access is possible.

In the case where access control is performed, a server device first tries to identify a user when the user has access thereto, and accepts access only in the case where a user who can be identified has a right of use.

In this manner, a processing, in which a server identifies a user and accepts access, is called user authentication.

In addition, in some cases, a server device does not perform authentication of a user but performs authentication of a client device that makes use of the server device.

In this case, the server device ignores which user uses the client device and identifies only which client device tries to have access thereto.

That is, whether a user or a client device should be authenticated is whether a right of use for a server device belongs to a user or a client device.

For the simplicity of explanation, there will be no specific discrimination below between whether a server device authenticates a user and whether a server device authenticates a client device.

Also, in the specification of the present application, a system, in which a client device asks a processing of a server device, is broadly generalized to be called a client server system irrespective of whether an authentication device/distributed processing server is made integral with another device and whether an authentication device/distributed processing server is present separately of another device.

In the method of authenticating a user, as described above, for example, a server device has beforehand issued authentication information (for example, a user ID and a user password) to a user on a client side and has stored the same.

When a user has access to a server device, the server device demands the user of inputting of authentication information, and collates the input authentication information with the stored authentication information to identify and authenticate the user.

Such user authentication includes a method, in which it is closed in a single server device, and a method, in which a plurality of server devices, respectively, have access to an exclusive authentication device via a network, the latter being called a single-sign-on-system.

Here, since user authentication systems are frequently operated every division, base, building even within a single organization such as the same company, or the like, a plurality of user authentication systems are generally existent in a single-sign-on-system.

Also, it is general that a single user has a different user ID and a different user password every user authentication system.

Accordingly, not only in the case of using a system, in which user authentication is performed every server, but also in the case of using a single-sign-on-system, a user must properly use user IDs and user passwords, which are different every user authentication system, depending upon to which user authentication system belongs a server device, of which the user will make use.

Also, let presume here a network linkage job (network linkage processing) for materializing a composite function demanded by a user through linkage of a plurality of server devices.

With a network linkage job, for example, a scanner device scans a paper document to make the same into electronic data, and the data is transferred to a near printer device via a network to be printed out, thereby enabling providing a duplicating function.

In this case, the plurality of server devices, respectively, perform access control in accordance with a user's right of use, and in the case where the plurality of server devices, respectively, belong to different user authentication systems, the user must perform user authentication plural times in order to execute a single processing and job (referred generally below to as processing and job).

Accordingly, in this case, when the number of server devices being linked is large, user authentication will become very troublesome for the user.

Also, with the user authentication system described above, respective server devices demand authentication of a user whenever the user has access to the respective server devices, and the user must meet all of these demands of authentication.

In the above-mentioned example, when a scanner device scans a large amount of paper documents, it takes much time up to completion of scanning, so that it takes much time between authentication demanded by the scanner device and authentication demanded by the printer device.

That is, in such case, a user cannot go away from a client device for a long period of time until authentication is demanded at the start of printing after a demand of authentication from the scanner device is completed, and so the network linkage job becomes hard to look after on a user's side.

As described above, in the case of linking a plurality of server devices to perform jobs, it is desirable to temporarily transfer rights of use of the respective server devices, which are required for implementing the jobs, to a third person on a network and to have the third person performing the jobs on behalf of a user.

When, for example, authentication information required for certify rights of use is transferred to a third person, however, there is a possibility that the authentication information is duplicated by the third person to be made bad use of at another occasion.

Also, likewise, when transfer of authentication information is monitored, there is a possibility that the authentication information is made bad use of.

Accordingly, when authentication information is transferred to a third person on a network, it is necessary to take measures for prevent the authentication information from being made bad use of except a proper use, whereby user's rights of use must be able to be temporarily transferred safely and simply.

From this point of view, the authentication method according to the invention transfers authentication information safely and temporarily on the assumption that authentication information is commonly owned by a user authentication system and a user (or a client).

The authentication method according to the invention creates and transfers delegation information b containing, to an extent required for implementing jobs, protected authentication information $c_i$ obtained by asymmetric-key encrypting binary digit strings, in which authentication information and validity information such as effective terms and effective ranges, or the like are combined together, in such a manner that the protected authentication information cannot be decrypted in a specific user authentication system i that has issued the authentication information.

However, $b=\{c_i\}$ is prescribed and $c_i=f((s_i, t), p_i)$ where $f(x)$ denotes a encryption function, $s_i$ denotes authentication information to the user authentication system i, t denotes validity information, and $p_i$ denotes a public key $p_i$ of a user authentication system i).

Here, validity information indicates a condition that corresponding delegation information is valid, and as an example of the condition there can be listed an effective term (time; effective until the term), a hash value of job description (effective only in the job), a network address (effective only in access from devices of the network address), or a combination of one or more optional ones of them.

In addition, the job description msg describes contents of a job, and corresponds to, for example, job content information describe later with reference to FIG. 5.

In the case of a hash value of job description as validity information, validity information t is represented as $t=md=h(msg)$.

A client device calculates a hash value md1 of job description, which is demanded by the device itself, includes the result in validity information to encrypt the same, and sends to a server device the same together with the job description.

The server device calculates a hash value md2 from the job description and sends to an authentication device the same together with the validity information as encrypted.

The authentication device makes a comparison between the hash value md1 of job description obtained from the validity information and the hash value md2 sent from the server device to determine defraud when the values are the same, that is, validity.

In addition, the server device may send validity information and job description to the authentication device, and the authentication device may make a comparison between the hash value md2 of job description and the hash value md1.

Here, the job description contains (a) a name of a server, of which the client device 3 demands, (b) a network address of a server device, in which a server operates, (c) contents of a processing demanded (containing optional conditions), and (d) a name of a server, in which a subsequent processing is implemented.

Also, h( ) denotes a hash function, msg denotes job description, and md denotes a hash value of job description.

In addition, delegation information may enumerate protected authentication information with respect to all authentication information preserved by a user.

Also, the authentication method according to the invention can be adapted to user authentication performed in a single server device in a closed state, and to a single-sign-on-system, in which an exclusive authentication device is provided on a network and a plurality of server devices own user authentication in common.

The Preferred Embodiment

An embodiment of the invention will be described below.

FIG. 1 is a view showing a configuration of a network system 1, to which an authentication method according to the invention is adapted.

The authentication method according to the invention is adapted to a network environment such as LAN (Local Area Network), Internet, Intranet, or the like, as in the network system 1 illustrated in FIG. 1.

As shown in FIG. 1, the network system 1 is configured, in which networks 20-0 to 20-n are connected to be able to have communications with one another by means of TCP/IP (Transmission Control Protocol/Internet Protocol).

Connected to the network 20-0 are server devices such as a client device 3, distributed processing server 5-0, a Web server 22-0, and so on.

Connected to the networks 20-1 to 20-4, respectively, are authentication servers 4-1 to 4-4, printer devices, file servers, scanner devices, image processing servers, and so on, the authentication servers 4-1 to 4-4, respectively, providing one or more functions, which can be materialized on an OS (Operating System) of computers.

In order to allow the client devices 3 to have access to the server devices 22-0 to 22-4, the server devices 22-0 to 22-4, respectively, set in the client devices 3 public keys pkey_01 to pkey_41 for encryption, user IDs (userid_01 to userid_41) and passwords password_01 to password_41.

Also, in order to decrypt data encrypted with the use of public keys pkey_01 to pkey_41, secret keys skey_0 to skey_4 are set.

In addition, the user IDs (userid_01 to userid_41) and passwords password_01 to password_41, respectively, are stored in a password administration table described later to be administered thereby.

Also, $n \geq 0$ is prescribed, and the case with n=4 is illustrated in FIG. 1.

Also, in the case of indicating which of plural constituents, such as the networks 20-1 to 20-4, or the like, without specific designation, such constituent is simply abbreviated to a network 20 below.

The network system 1 uses these constituents to offer to users of the client devices 3 a network linkage job, which links a plurality of server devices to provide a composite function.

Figure 2:
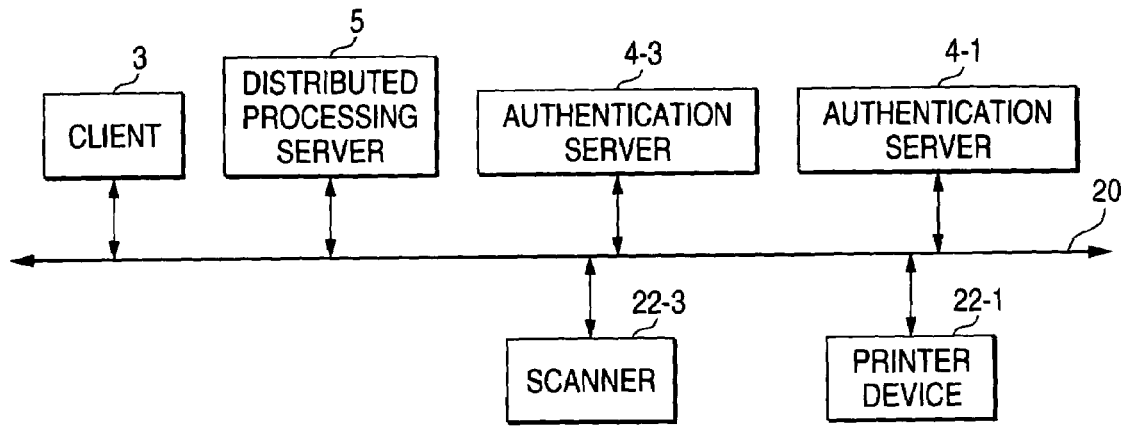
FIG. 2 is a view showing a network linkage job indicated as an embodiment of the invention.

FIG. 2 is a view showing a network linkage job indicated as an embodiment of the invention.

While the client device 3 can demand a job of any one of the server devices 22 in the network system 1, the case where the client device 3 is presented a network linkage job, which is made up of scanners, printers (server devices 22-1, 22-3), and the authentication servers 4-1, 4-3, as shown in FIG. 2, is taken as a concrete example for the purpose of making an explanation of the embodiment concrete and definite.

Hardware Configurations of Respective Devices

Figure 3:
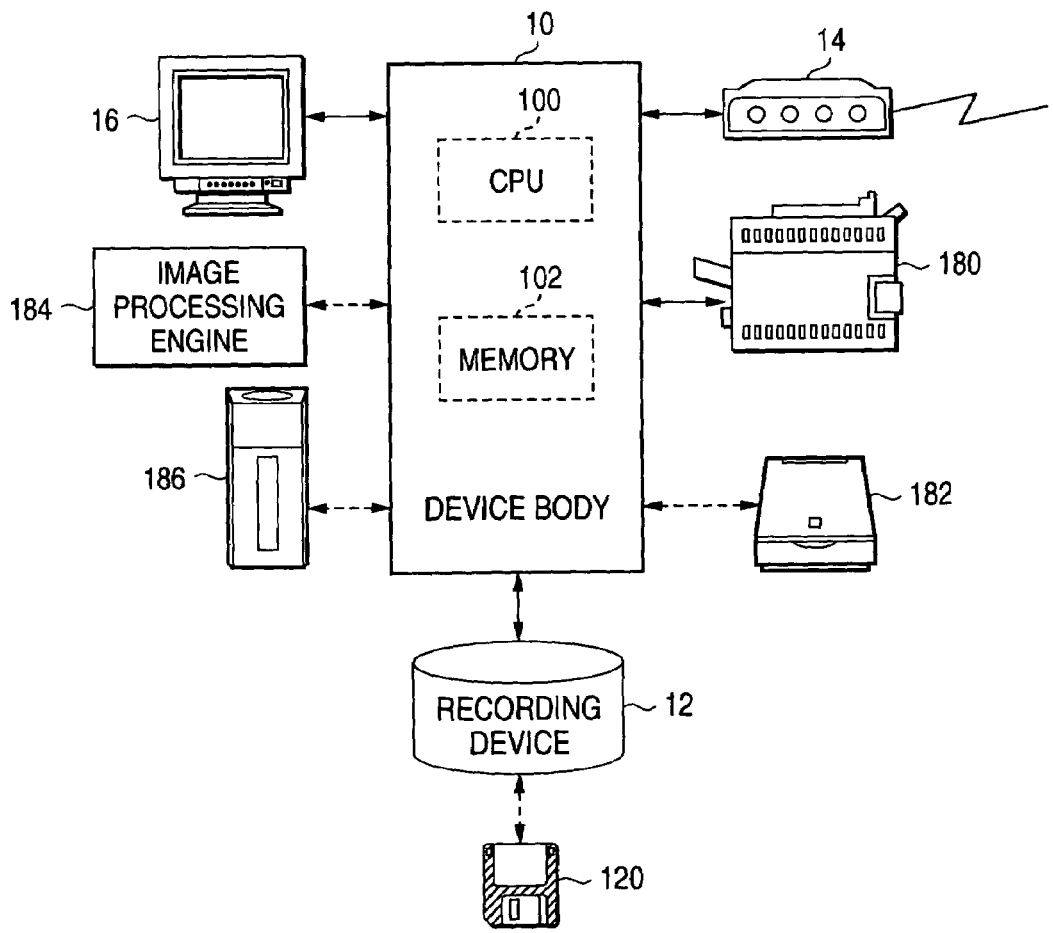
FIG. 3 is a view illustrating hardware configurations of client devices, authentication servers, distributed processing servers, and server devices, which are shown in FIG. 1.

FIG. 3 is a view illustrating hardware configurations of the client device 3, the authentication server 4, the distributed processing server 5, and the server device 22, which are shown in FIG. 1.

As shown in FIG. 3, the client device 3, the authentication server 4, the distributed processing server 5, and the server device 22, respectively, comprise a device body 10 including a CPU 100, a memory 102, and so on, a recording device 12 such as HDD/CD/FD devices, a communication device 14, and a display/input device 16 including a LCD display device, keyboard, and so on.

Further, the server device 22 comprises a printer device 180, a scanner device 182, an image processing engine 184, and a file device 186, respectively, as constituents required for providing a server function.

The client device 3, the authentication server 4, the distributed processing server 5, and the server device 22, respectively, comprise constituents as a computer capable of having a communication via networks, the constituents, respectively, loading in the memory 102 an OS supplied via a recording medium 120, or the like, and other software to implement the same.

Software Configuration

Figure 4:
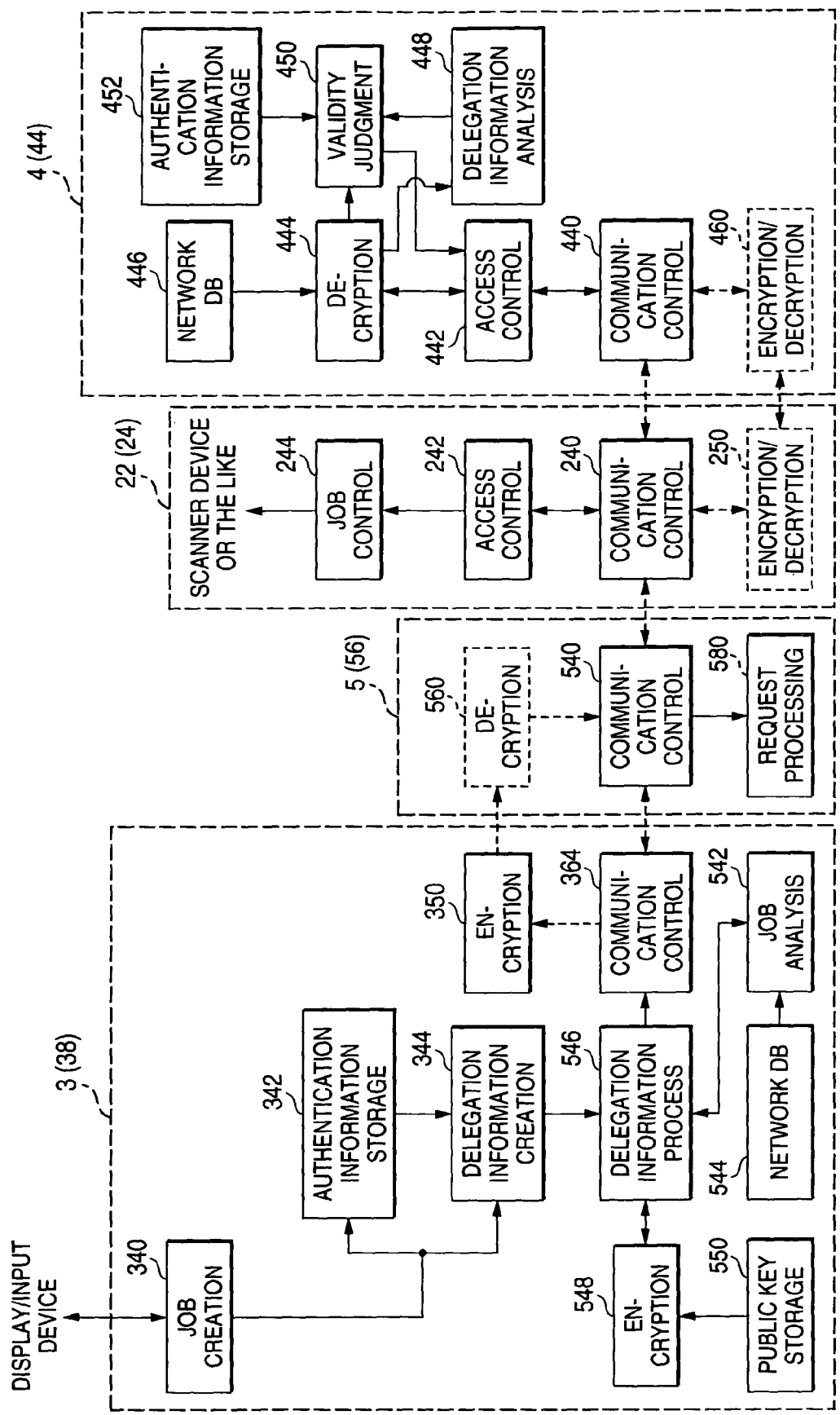
FIG. 4 is a view illustrating configurations of programs for materializing a network linkage job and an authentication processing in the network system.

FIG. 4 is a view illustrating configurations of programs for materializing a network linkage job and an authentication processing in the network system 1.

As shown in FIG. 4, a client program 38 implemented in the client device 3 comprises a job creation unit 340, authentication information storage unit 342, delegation information creation unit 344, communication control unit 364, job analysis unit 542, network database (network DB) 544, delegation information processing unit 546, encryption unit 548, and a public key storage unit 550.

The client device 3 uses these constituents to create image data and a job to demand a network linkage job of the server device 22.

The job creation unit 340 creates image data in response to an operation by a user, and further creates a processing job, which is to be implemented by a scanner/printer (server devices 922-1, 22-3).

The authentication information storage unit 342 stores authentication information required for access to the server devices 22, respectively, such as network addresses (IP address, DNS (Domain Name System) addresses, MAC (Media Access Control) addresses of Ethernet (trade mark of Zerox Ltd.) and so on), a user ID, a password, a public key (FIG. 1), and so on.

Figure 5:
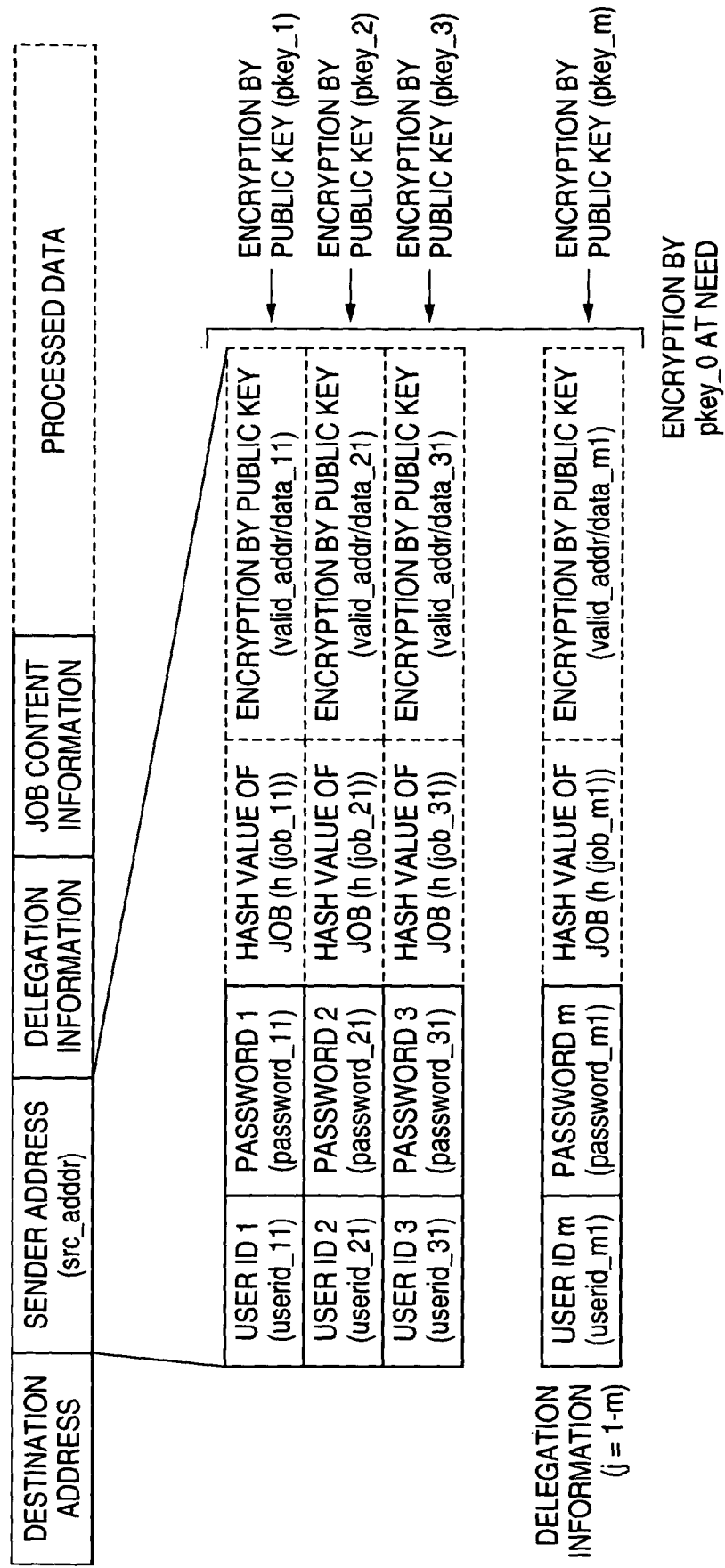
FIG. 5 is a view illustrating access demand messages sent to the server devices by a client program and delegation information created by a delegation information creation unit shown in FIG. 4.

FIG. 5 is a view illustrating access demand messages sent to the server devices 22 by the client program 38 and delegation information created by the delegation information creation unit 344 shown in FIG. 4.

The delegation information creation unit 344 creates delegation information #1 to #m (FIG. 5; m≧1) for the server devices 22, which demand network linkage jobs, respectively, on the basis of jobs input from the job creation unit 340 and authentication information stored in the authentication information storage unit 342 to output the same to the delegation information processing unit 546.

As shown in FIG. 5, the delegation information #1 to #m of m in number for the respective server devices 22 of m in number, created by the delegation information creation unit 344 contains a user ID (userid_11 to userid_m1) set in the client device 3 for access to the respective server devices 22, a password (password_11 to password_m1), hash values (the hash value md1; h(job_11) to h(job_m1)) of job content information (FIG. 5; job descriptions 1 to m) representative of contents of jobs demanded of the respective server devices 22, and validity information (valid_addr/date_11 to valid_addr/date_n1).

In addition, FIG. 5 illustrates the case where the delegation information #1 to #m contains as validity information, a range (addr) of network addresses, in which the delegation information #1 to #m is made effective, and effective dates (date).

Also, binary digit strings called separators actually partition a user ID (userid_11 to userid_m1), a password (password_11 to password_m1), and a hash value (hash value md1; h(job_11) to h(job_m1)) of job content information (FIG. 5; job descriptions), and these data are connected together.

The public key storage unit 550 stores public keys pkey_0 to pkey_n set in the server devices 22, respectively.

The encryption unit 548 uses public keys pkey_1 to pkey_n set in the server devices 22 of m in number, respectively, to encrypt delegation information #1 to #m sent to the server devices 22 of m in number, respectively, as shown in FIG. 5.

The network DB 544 stores information representative of what kind of jobs offered by the server devices 22 contained in the networks 20, respectively, in the network system 1 and network addresses of the respective server devices 22.

The job analysis unit 542 receives and analyzes jobs, which are demanded of the server devices 22, from the delegation information processing unit 546 to decompose the jobs into jobs, which are offered by the server devices 22, respectively.

The job analysis unit 542 makes network addresses of the respective server devices 22, of which jobs are demanded, and contents (job_11 to job_m1; FIG. 5) of jobs demanded of these server devices 22, respectively, correspond to each other to output the correspondence to the delegation information processing unit 546.

The delegation information processing unit 546 outputs jobs input from the delegation information creation unit 344, to the job analysis unit 542, and receives the server devices 22, of which jobs are demanded, and their network addresses.

Also, the delegation information processing unit 546 outputs delegation information #1 to #m (FIG. 5) input from the delegation information creation unit 344, to the encryption unit 548 to cause the same to perform encryption by means of public keys pkey_1 to pkey_m.

The delegation information processing unit 546 creates access demand messages containing addresses (destination addresses) of the server devices 22 being destinations shown in FIG. 5, a network address (sender address) of the client device 3, and delegation information #1 to #m as encrypted to output the same to the communication control unit 364.

In addition, job content information representative of contents of processings is added to the delegation information in FIG. 5, and processed data are further added to the access demand messages in the case where there is a need of sending processed data, which are an object of processings, such as image data or the like, to the server devices 22 as shown by dotted lines in FIG. 5.

The communication control unit 364 sends the access demand messages to the distributed processing server 5 via the network 20-0.

In addition, the communication control unit 364 may serve as a communication control unit (cryptographic unit 350) with an encryption function to send access demand messages, which are encrypted by a public key pkey_0, to the distributed processing server 5.

Reference is again made to FIG. 4.

As shown in FIG. 4, a distributed processing program 56 implemented in the distributed processing server 5 comprises a communication control unit 540 and a request processing unit 580.

The request processing unit 580 performs a processing such as routing required for communication with the server devices 22 on the basis of destination addresses contained in the access demand messages sent from the client device 3 (the communication control unit 364 of the client program 38; FIG. 4).

The communication control unit 540 transfers the access demand messages received from the client device 3 to each of the server devices 22 of m in number, of which the client device 3 demands jobs, in accordance with the routing produced by the request processing unit 580.

In addition, in the case where the encryption unit 350 is used on a side of the client device 3 as shown by dotted lines in FIG. 4, a communication control unit (decryption unit 560) having a function of decryption is also used on a side of the distributed processing server 5.

Also, a server program 24 implemented in the server device 22 comprises a communication control unit 240, access control unit 242, and a job control unit 244.

The communication control unit 240 performs a processing of communication between the distributed processing server 5 and the authentication server 4.

When receiving access demand messages (FIG. 5) via the communication control unit 240, the access control unit 242 sends authentication demand messages, to which information contained in the access demand messages is added, to the authentication server 4 to cooperate with the authentication server 4 to perform an authentication processing described later with reference to FIGS. 7 and 8.

The access control unit 242 outputs to the job control unit 244 job content information (FIG. 5; job description) contained in the access demand messages and processed data in the case where a user of the client device 3 having sent the access demand messages is identified and can be recognized to have a right of using the server devices 22, that is, a user of the client device 3 is admitted.

The job control unit 244 controls respective constituents (FIG. 2) of the server devices 22 to implement jobs input from the access control unit 242.

In addition, the communication control unit 540 may serve as a communication control unit (cryptographic/decryption unit 250) having an encryption function to send access demand messages encrypted by means of a public key pkey_j to the authentication server 4.

Also, an authentication program 44 implemented in the authentication server 4 comprises, as shown in FIG. 4, a communication control unit 440, access control unit 442, decryption unit 444, network DB 446, delegation information analysis unit 448, validity judgment unit 450, and an authentication information storage unit 452.

The communication control unit 440 controls communication between it and the server devices 22.

The network DB 446 stores information (a hash function and a secret key skey_j) required for decryption of job content information and delegation information #j, which corresponds to the server devices 22 being senders of authentication demand messages, shown in FIG. 5.

The decryption unit 444 uses the secret key skey_j to decrypt the encrypted delegation information #j contained in authentication demand messages received from the communication control unit 440.

The delegation information analysis unit 448 analyzes the decrypted delegation information #j (FIG. 5) to output to the validity judgment unit 450 a user IDj (userid_j1), password (password_j1), hash value (hash value md1; h(job_11) to h(job_m1)) of job content information (FIG. 5; job description (job_j1)), and validity information (valid_addr/date_j1), which are obtained as a result of the analysis.

The authentication information storage unit 452 stores in respective entries of the password administration table, authentication information required for authentication of a user, such as a use ID (userid_j1) and a password (password_j1), which are given to a user of the client device 3, and a hash function used in calculation of a hash value (hash value md1) of job content information (FIG. 5; job description) in the respective client devices 3.

For example, rows in the password administration table correspond to user IDs and passwords, and columns in the table correspond to entries of respective users.

The validity judgment unit 450 collates authentication information stored in the authentication information storage unit 452 with a user ID (userid_j1), a password (password_j1), and validity information (valid_addr/date_j1), which are input from the decryption unit 444, to judge whether delegation information #j is valid or not.

Also, the validity judgment unit 450 uses a hash function stored in the authentication information storage unit 452 to calculate a hash value md2 of the decrypted job content information (FIG. 5; job description).

The validity judgment unit 450 makes a comparison between the calculated hash value md2 and the hash value md1 to judge the delegation information #j to be valid when the both values agree with each other, and to judge the delegation information #j not to be valid except the case.

The access control unit 442 performs an authentication processing, which is described later with reference to FIGS. 7 and 8, in the case where data received from the server devices 22 via the communication control unit 440 are authentication demand messages.

Also, the access control unit 442 authenticates a user having access to the server devices 22, when the delegation information #j is valid, and does not authenticate a user having access to the server devices 22, except the case.

In addition, it is also possible to transfer encrypted data between the server devices 22 and the authentication server 4 by using a communication control unit (cryptographic/decryption unit 250, 460), which performs encryption and decryption with the use of a public key pkey_j and a secret key skey_j, in place of the communication control units 240, 440, as shown by dotted lines in FIG. 4.

An operation of the network system 1 will be described below.

Figure 6:
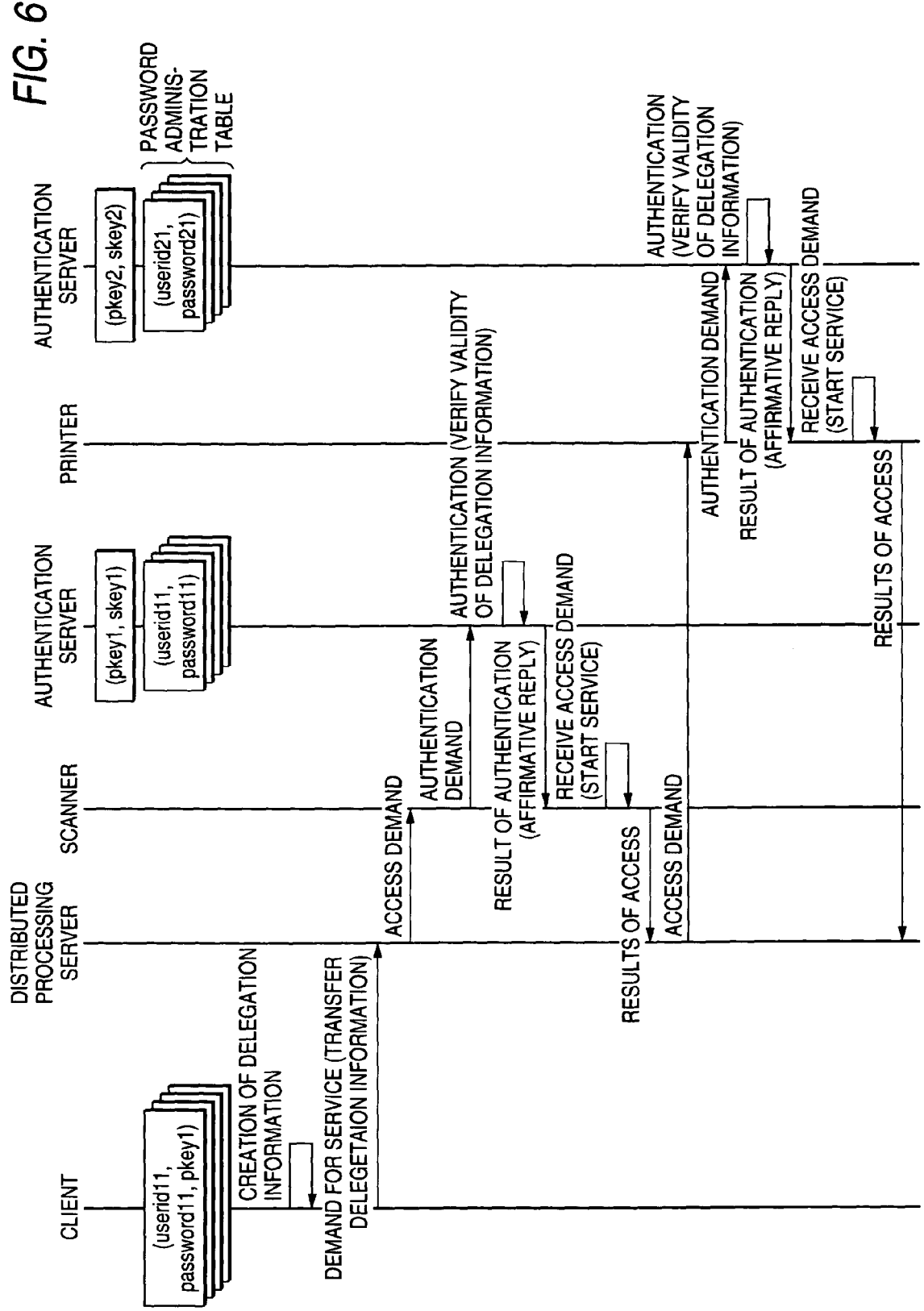
FIG. 6 is a view showing a communication sequence among client devices, distributed processing servers, scanners, first authentication servers, printers, and second authentication servers, shown in FIGS. 1 and 2.

FIG. 6 is a view showing a communication sequence among the client device 3, distributed processing server 5-0, scanner (server device 22-3), first authentication server 4-3, printer (server device 22-1), and the second authentication server 4-1, shown in FIGS. 1 and 2.

When a user operates the client device 3 to create jobs with the use of the job creation unit 340 (FIG. 4) as shown in FIG. 6, the delegation information creation unit 344 creates delegation information (FIG. 5).

Further, constituents of the client program 38, such as the delegation information processing unit 546, or the like, create access demand messages (FIG. 5) to send the same to the distributed processing server 5-0 to transfer delegation information thereto.

The distributed processing program 56 (FIG. 4) of the distributed processing server 5-0 receives an access demand message from the client device 3 to send the same to the scanner (server device 22-3).

The scanner (server device 22-3) outputs an authentication demand message to the authentication server 4-3.

The authentication server 4-3 verifies validity of authentication information to authenticate a user of the client device 3 to return, for example, affirmative results of authentication to the scanner (server device 22-3), as described later with reference to FIGS. 7 and 8.

The access control unit 242 (FIG. 4) of the scanner (server device 22-3) receives affirmative results of authentication from the authentication server 4-3 to inform the job control unit 244 of this.

The job control unit 244 starts a job, which is to be presented to the client device 3, in accordance with job content information (FIG. 5; job description) returned from the authentication server 4 to perform a scanning processing.

The access control unit 242 (FIG. 4) of the scanner (server device 22-3) returns to the distributed processing server 5-0 results of access together with image data obtained in the scanning processing.

The distributed processing server 5-0 adds image data, which are obtained as a result of the scanning, to an access demand message to send the same to the printer (server device 22-1).

The printer (server device 22-1) outputs an authentication demand message to the authentication server 4-1.

The authentication server 4-1 verifies validity of authentication information to authenticate a user of the client device 3 to return, for example, affirmative results of authentication to the printer (server device 22-1).

The access control unit 242 (FIG. 4) of the printer (server device 22-1) receives affirmative results of authentication from the authentication server 4-1 to inform the job control unit 244 of this, and the job control unit 244 starts a job (service), which is to be presented to the client device 3, to perform a printing processing of image data sent from the distributed processing server 5-0.

When the access control unit 242 of the printer (server device 22-1) returns results of access to the distributed processing server 5, the processing is terminated.

Figure 7:
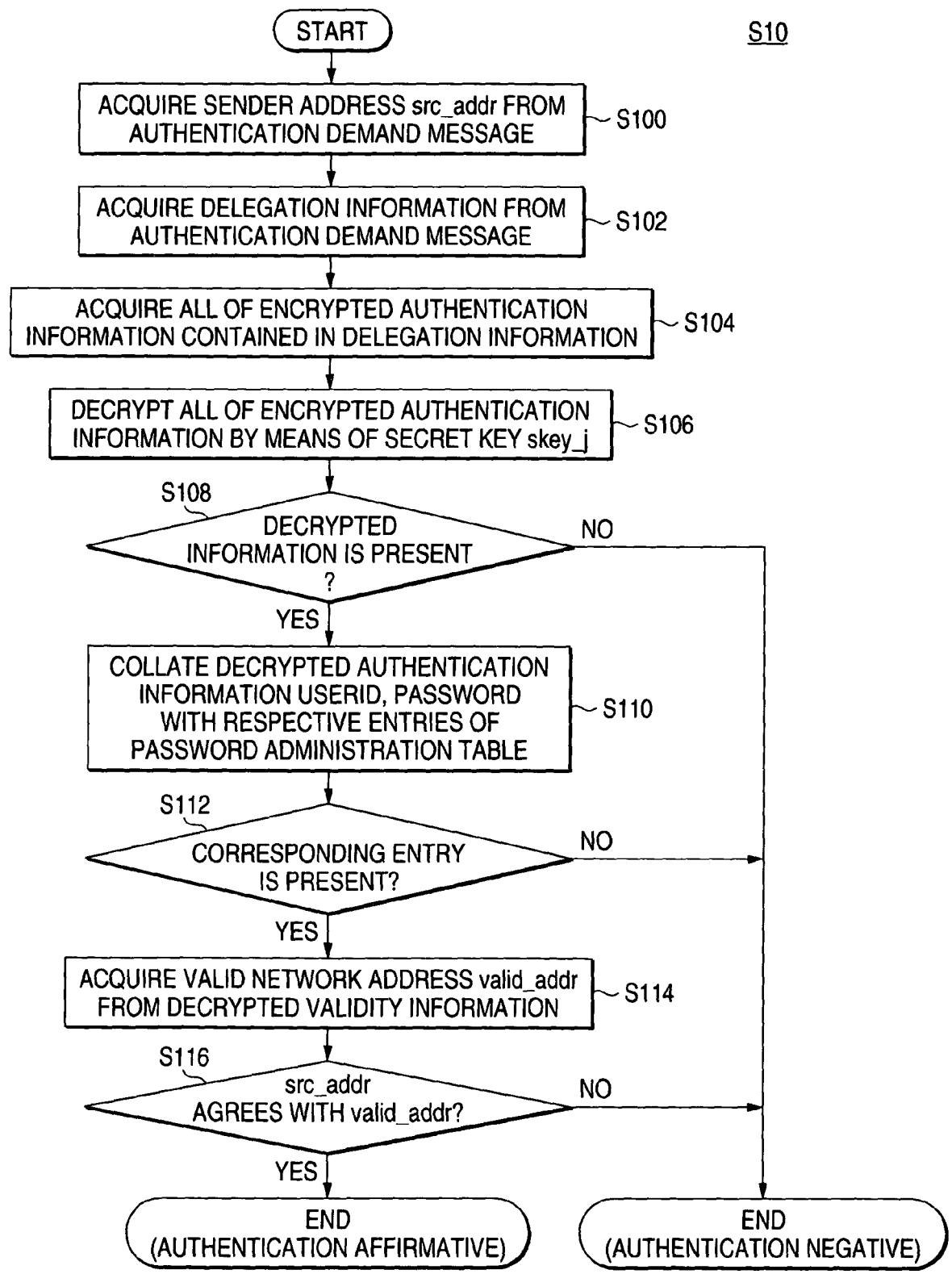
FIG. 7 is a flowchart illustrating an authentication processing (S10) making use of a user ID and a password sent to an authentication server from a client device.

FIG. 7 is a flowchart illustrating an authentication processing (S10) making use of a user ID and a password sent to the authentication server 4 from the client device 3.

Figure 8:
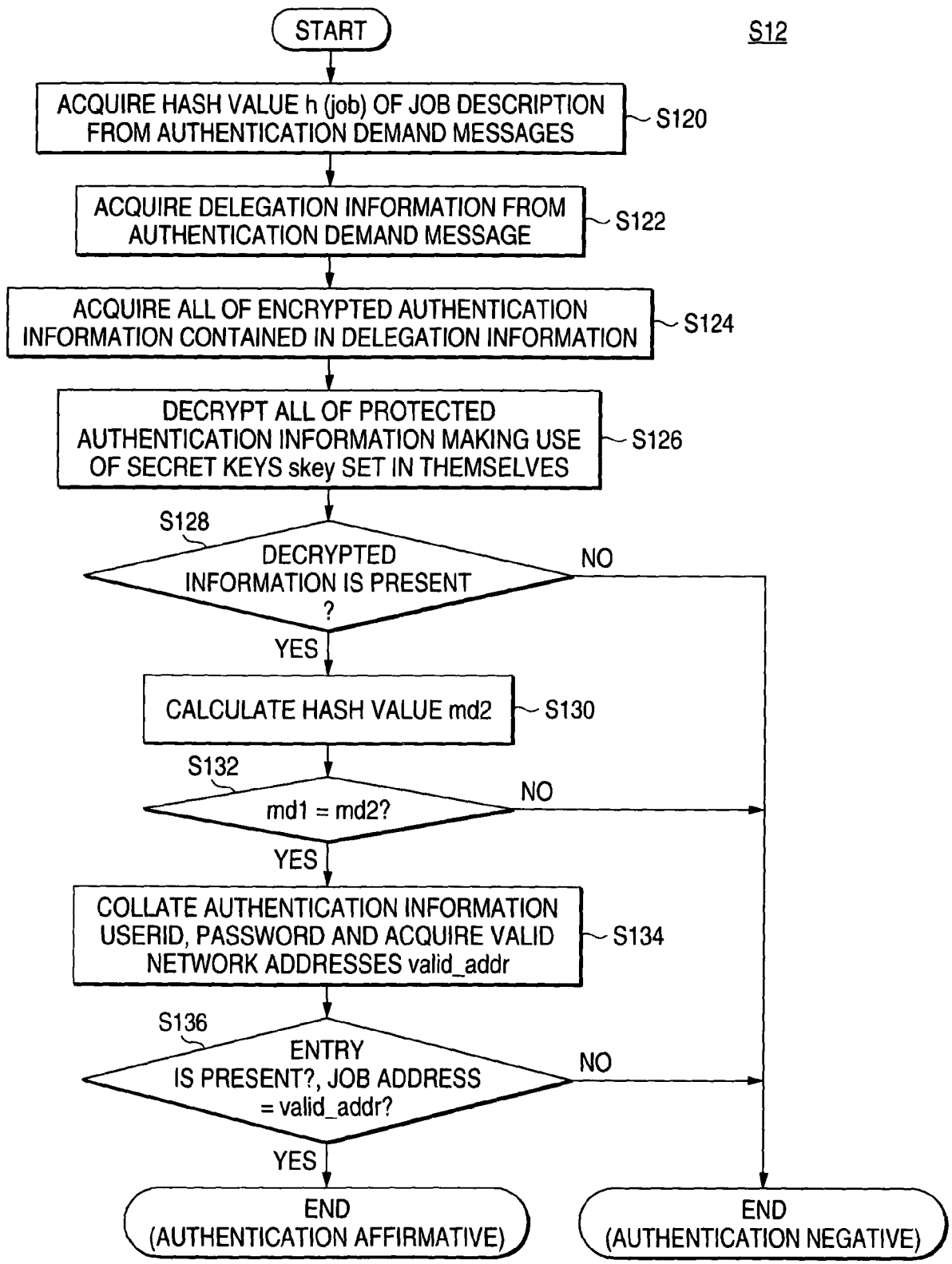
FIG. 8 is a flowchart illustrating an authentication processing (S12) making use of a hash value of job content information (FIG. 5; job descriptions) sent to the authentication server from a client device.

FIG. 8 is a flowchart illustrating an authentication processing (S12) making use of a hash value (hash value md1; h(job_11) to h(job_m1)) of job content information (FIG. 5; job descriptions) sent to the authentication server 4 from the client device 3.

The authentication program 44 performs the authentication processings shown in FIGS. 7 and 8 or either of the processings to authenticate a user of the client device 3.

In the case of performing authentication making use of a user ID and a password, the access control unit 442 of the authentication program 44 (FIG. 4) receives authentication demand messages sent from the server devices 22 to acquire sender addresses (src_addr) contained in the received authentication demand messages in STEP 100 (S100) as shown in FIG. 7.

In STEP 102 (S102), the access control unit 442 acquires delegation information (FIG. 4) contained in the authentication demand messages.

In STEP 104 (S104), the decryption unit 444 acquires all of encrypted authentication information contained in the delegation information.

In STEP 106 (S106), the decryption unit 444 decrypts all of the acquired authentication information with the use of secret keys skey_j set in the server devices 22.

In STEP 108 (S108), the decryption unit 444 judges whether normally decrypted information is present in the decrypted authentication information.

In the case where normally decrypted information is present, the authentication program 44 proceeds to a processing in S110, and returns negative results of authentication to the server devices 22 except the case to terminate the processing.

In STEP 110 (S110), the validity judgment unit 450 collates the normally decrypted authentication information (a password and a user ID) with respective entries of the password administration table of the authentication information storage unit 452.

In STEP 112 (S112), the validity judgment unit 450 judges whether an entry corresponding to the normally decrypted authentication information (a password and a user ID) is present in the password administration table of the authentication information storage unit 452 in the processing of S110.

In the case where a corresponding entry is present, the authentication program 44 proceeds to a processing in S114, and returns negative results of authentication to the server devices 22 except the case to terminate the processing.

In STEP 114 (S114), the validity judgment unit 450 acquires network addresses valid_addr, in which jobs are made effective, and effective dates valid_date from the decrypted validity information.

In STEP 116 (S116), the validity judgment unit 450 judges whether the network addresses valid_addr acquired in the processing of S114 agree with sender addresses src_addr acquired in the processing of S100.

Also, the validity judgment unit 450 makes a comparison between the network addresses valid_addr acquired in the processing of S114 and calendar/time information administered by the authentication server 4 to judge whether effective dates have elapsed.

In the case where the network addresses valid_addr agree with the sender addresses src_addr and effective dates have not elapsed, the authentication program 44 returns affirmative results of authentication to the server devices 22 and returns negative results of authentication to the server devices 22 except the case to terminate the processing.

Also, in the case of performing authentication making use of the hash value of job content information (FIG. 5; job descriptions), the access control unit 442 of the authentication program 44 (FIG. 4) receives authentication demand messages sent from the server devices 22 to acquire a hash value (h(job_j); the hash value md1) of job content information contained in the received authentication demand messages in STEP 120 (S120) as shown in FIG. 8.

In STEP 122 (S122), the access control unit 442 acquires delegation information (FIG. 4) contained in the authentication demand messages.

In STEP 124 (S124), the decryption unit 444 acquires encrypted authentication information contained in the delegation information.

In STEP 126 (S126), the decryption unit 444 acquires all of the acquired authentication information making use of secret keys skey_j set in the server devices 22.

In STEP 128 (S128), the decryption unit 444 judges whether normally decrypted information is present in the decrypted authentication information.

In the case where normally decrypted information is present, the authentication program 44 proceeds to a processing in S130, and returns negative results of authentication to the server devices 22 except the case to terminate the processing.

In STEP 130 (S130), the validity judgment unit 450 calculates a hash value md2 of job content information (FIG. 5; job descriptions). In STEP 132 (S132), the validity judgment unit 450 judges whether the hash value md1 contained in the delegation information agrees with the hash value md2 calculated in the processing of S130. In the case where the both values agree with each other, the authentication program 44 proceeds to a processing in S134, and returns negative results of authentication to the server devices 22 except the case to terminate the processing.

In STEP 134 (S134), the validity judgment unit 450 collates the normally decrypted authentication information (a password and a user ID) with respective entries of the password administration table of the authentication information storage unit 452.

Also, the validity judgment unit 450 acquires network addresses valid_addr, in which jobs are made effective, from the decrypted validity information.

In STEP 136 (S136), the validity judgment unit 450 judges whether an entry corresponding to the normally decrypted authentication information (a password and a user ID) is present in the password administration table of the authentication information storage unit 452 in the processing of S130.

Also, the validity judgment unit 450 judges whether network addresses of the server devices 22 contained in job content information (FIG. 5; job descriptions) agree with network addresses valid_addr acquired in the processing of S130.

In the case where a corresponding entry is present and the network addresses of the server devices 22 agree with network addresses valid_addr acquired in the processing of S134, the authentication program 44 returns affirmative results of authentication to the server devices 22 to terminate the processing, and returns negative results of authentication to the server devices 22 except the case to terminate the processing.

Modified Examples

Modified examples will be described below.

Modification in Allotment of Functions

FIGS. 9 to 12 are views showing first to fourth modified examples, in which allotment of functions of programs is modified.

In addition, the same reference numerals denote those constituents shown in FIGS. 9 to 12, which are substantially the same as those shown in FIG. 4.

In addition, allotment of functions can be variously effected among the client device 3, distributed processing server 5, server device 22, and the authentication server 4 shown in FIG. 4 in accordance with use/scale of a system and its constituents.

Figure 9:
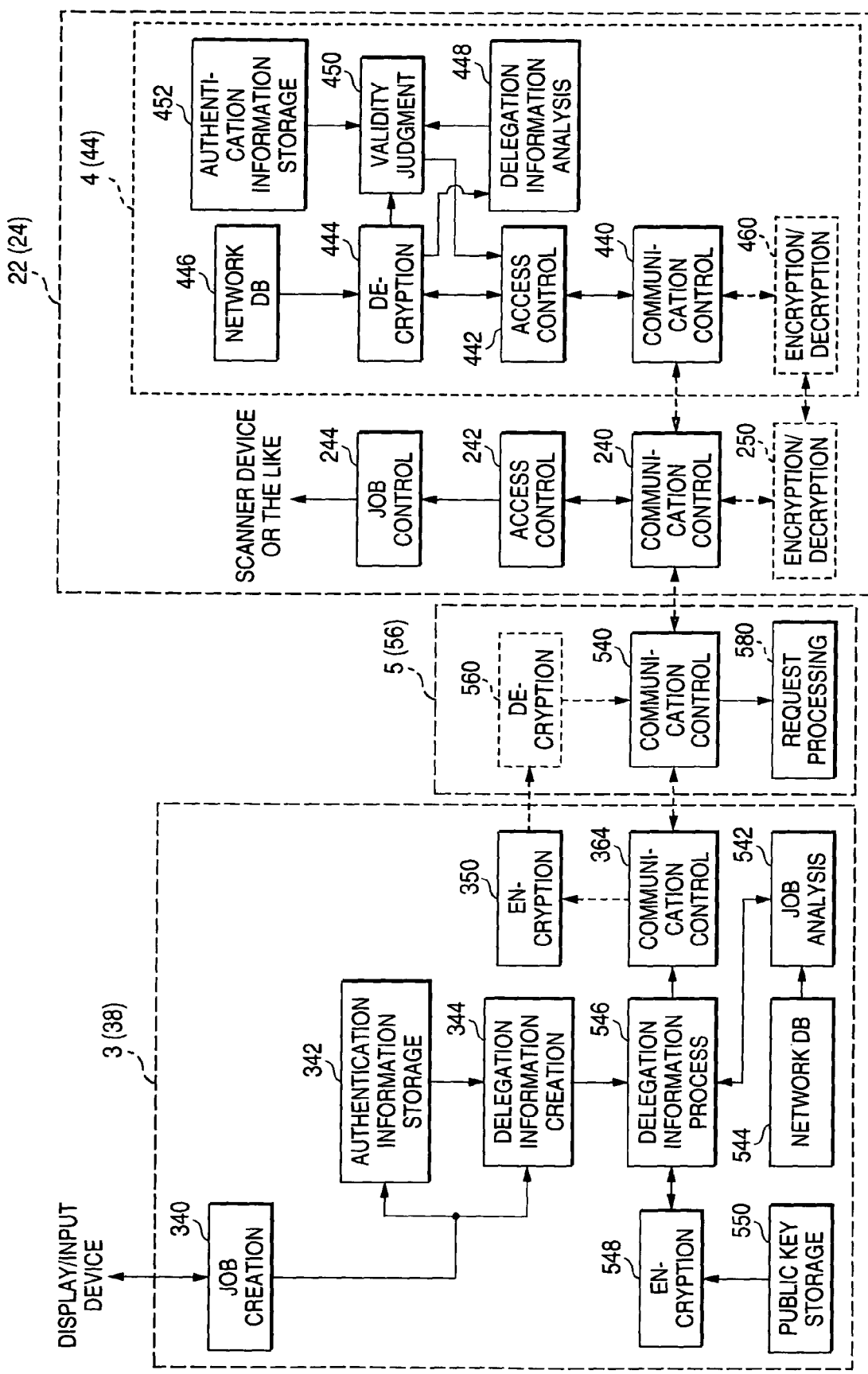
FIG. 9 is a view showing a first modified example, in which allotment of functions of programs is modified.

That is, a server device 22 implements both the server program 24 (FIG. 4) and the authentication program 44, thus enabling omitting the authentication server 4 from the network 20 as shown in FIG. 9.

Figure 10:
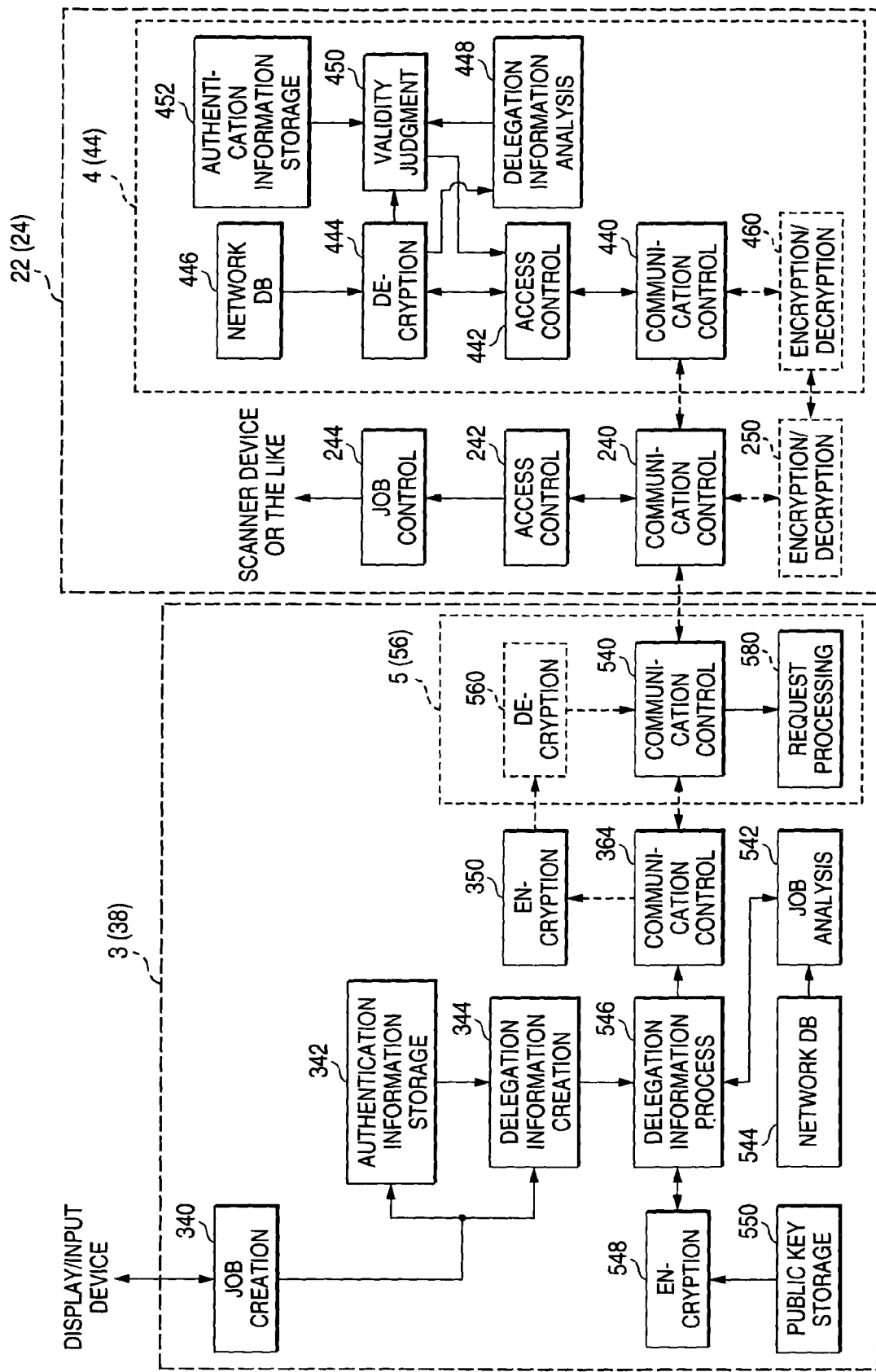
FIG. 10 is a view showing a second modified example, in which allotment of functions of programs is modified.

Also, a client device 3 materializes both the client program 38 and the distributed processing program 56, thus enabling omitting the distributed processing server 5 from the network 20 as shown in FIG. 10.

Figure 11:
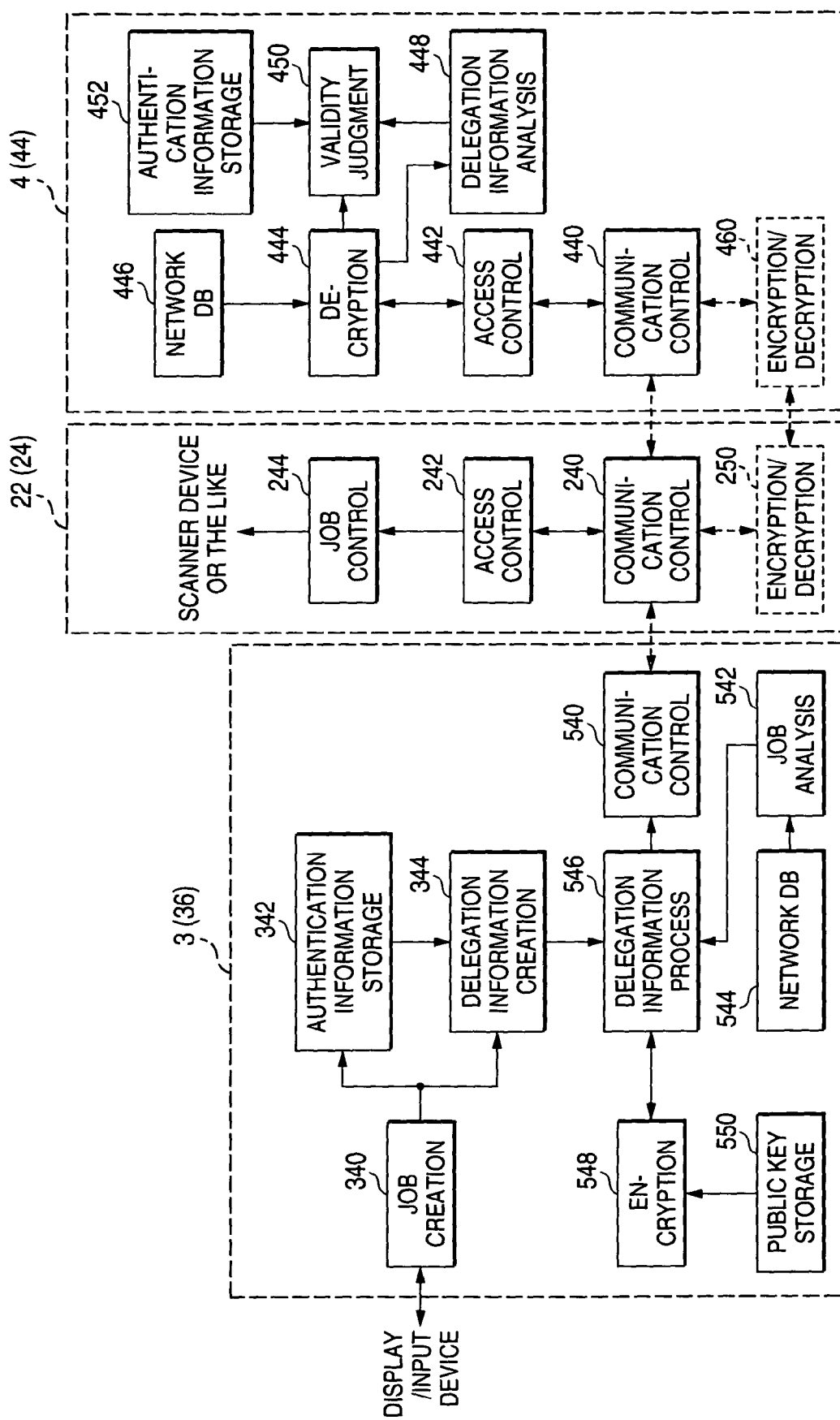
FIG. 11 is a view showing a third modified example, in which allotment of functions of programs is modified.

Also, a client program 36 provided with functions of both the server program 24 and the distributed processing program 56 can be provided by uniting the client device 3 and the distributed processing server 5 and omitting portions common to the server program 24 and the distributed processing program 56 as shown in FIG. 11.

Figure 12:
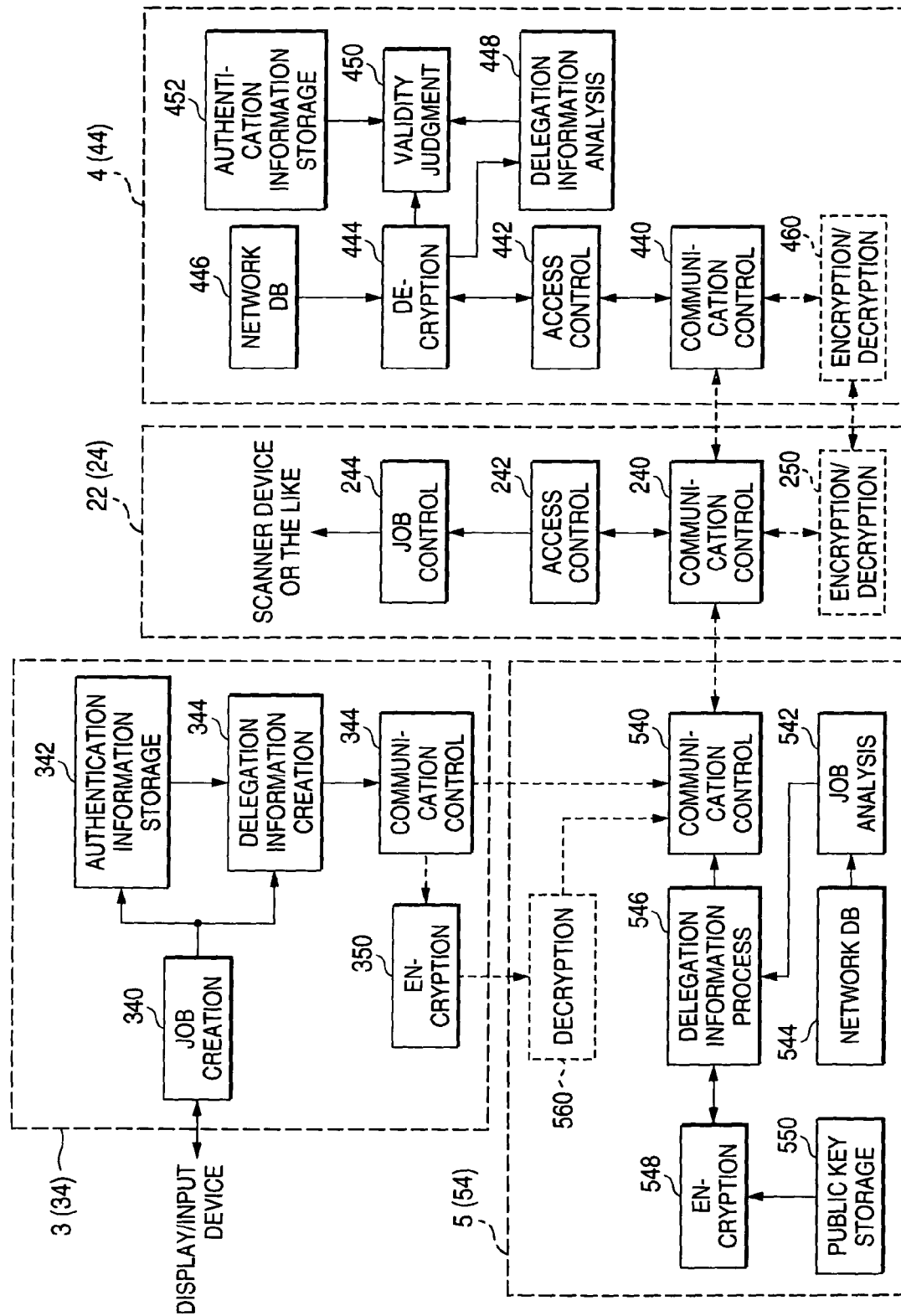
FIG. 12 is a view showing a fourth modified example, in which allotment of functions of programs is modified.

Also, functions of the client device 3 may be largely moved to a side of the distributed processing server 5 by moving the job analysis unit 542—the public key storage unit 550 to a side of the distributed processing program 56 from the client program 38 of the client device 3 to make a client program 34 and a distributed processing program 54 as shown in FIG. 12.

Modification of Ranges of Authentication

Figure 13:
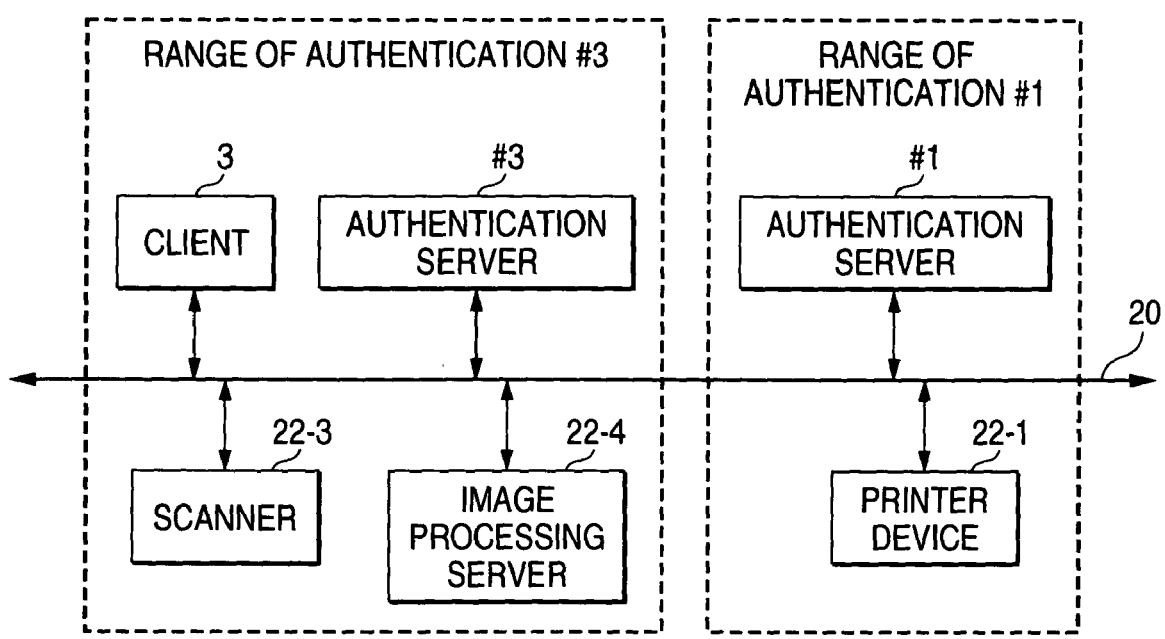
FIG. 13 is a view showing a network linkage job represented as a modification of the embodiment of the invention.

FIG. 13 is a view showing a network linkage job represented as a modification of the embodiment of the invention.

FIGS. 1 and 2 illustrate the case where the server devices 22-0 to 22-4 and the authentication servers 4-0 to 4-4 cooperate with each other to perform authentication of the client device 3 for the networks 20-0 to 20-4, respectively.

In contrast, ranges of authentication of the authentication server 4 can be modified such that the authentication server 4-3 cooperates with a scanner and an image processing server (server devices 22-3, 22-4), which belong to the same and different network 20-3, 20-4, to perform authentication as shown in, for example, FIG. 13.

In addition, FIG. 13 illustrates the case where the function of the distributed processing server 5-0 is taken into the client device 3.

FIG. 14 is a view showing a communication sequence among a client device 3, scanner and image processing server (server devices 22-3, 22-4), first authentication server 4-3, printer (server device 22-1), and a second authentication server 4-1, shown in FIGS. 1 and 13.

In this manner, in the case where a range of authentication of the authentication server 4 is modified, the delegation information creation unit 344 creates delegation information (FIG. 5) when a user operates the client device 3 to create a job with the use of the job creation unit 340 (FIG. 4) as shown in FIG. 14.

Further, constituents of the client program 38, such as the delegation information processing unit 546, or the like, create access demand messages (FIG. 5) to send the same to the scanner (server device 22-3) to transfer delegation information thereto.

Having received access demand messages from the client device 3, the scanner (server device 22-3) outputs an authentication demand message to the authentication server 4-3.

The authentication server 4-3 verifies validity of authentication information to authenticate a user of the client device 3 to return, for example, affirmative results of authentication to the scanner (server device 22-3), as described with reference to FIGS. 7 and 8.

The access control unit 242 (FIG. 4) of the scanner (server device 22-3) receives affirmative results of authentication from the authentication server 4-3 to inform the job control unit 244 of this.

The job control unit 244 starts a job, which is to be presented to the client device 3, in accordance with job content information (FIG. 5; job description) to perform a scanning processing.

When the scanning processing is terminated, the scanner (server device 22-3) sends to the image processing server (server device 22-4) an access demand message together with image data obtained by the scanning processing to transfer delegation information thereto.

Having received an access demand message from the scanner (server device 22-3), the image processing server (server device 22-4) outputs an authentication demand message to the authentication server 4-3.

The authentication server 4-3 verifies validity of authentication information to authenticate a user of the client device 3 to return, for example, affirmative results of authentication to the image processing server (server device 22-4).

The access control unit 242 (FIG. 4) of the image processing server (server device 22-4) receives affirmative results of authentication from the authentication server 4-3 to inform the job control unit 244 of this.

The job control unit 244 starts a job, which is to be presented to the client device 3, in accordance with job content information (FIG. 5; job description) to perform an image processing.

When the image processing is terminated, the scanner (server device 22-3) sends to the printer (server device 22-1) an access demand message together with image data having been subjected to image processing to transfer delegation information thereto.

The printer (server device 22-1) outputs an authentication demand message to the authentication server 4-1.

The authentication server 4-1 verifies validity of authentication information to authenticate a user of the client device 3 to return, for example, affirmative results of authentication to the printer (server device 22-1).

The access control unit 242 (FIG. 4) of the printer (server device 22-1) receives affirmative results of authentication from the authentication server 4-1 to inform the job control unit 244 of this, and the job control unit 244 starts a job, which is to be presented to the client device 3, to perform a printing processing of image data sent from the image processing server (server device 22-4).

In addition, the configuration shown in FIG. 13 sequentially delivers job content information (FIG. 5; job description), in which a series of processings bridging across a plurality of server devices is described, to a server device taking charge of a subsequent process as if the respective server devices perform a relay race.

With such configuration, linkage and cooperation of a plurality of server devices, which are concentratedly materialized in the configuration shown in FIG. 4 with the use of the distributed processing server, can be materialized in a distributed manner without the use of any distributed processing server.

With the configuration shown in FIG. 13, linkage of servers is not established unless authentication information for a plurality of server devices, which is related to a series of processings, is collectively delivered like a baton.

When any measures are not taken in this case, however, authentication information for a particular server device can be opened to respective server devices and so there is a risk that the authentication information is made bad use of at another opportunity separate from an intended processing.

The configuration shown in FIG. 4 can prevent authentication information for a particular server device from being delivered to respective server devices other than distributed processing servers, and so it is lower in risk of leakage of authentication information than the configuration shown in FIG. 13.

Accordingly, authentication according to the invention can rather effectively prevent leakage of authentication information in the configuration shown in FIG. 13.

Others

Also, more preferably, a mail of a user of the client device 3 is encrypted to be added to delegation information, and in the case where authentication results in a negative, or notwithstanding authentication results in an affirmative or results in a negative, the server device 22, distributed processing server 5 or the authentication server 4 informs a user of the client device 3 of that effect.

As described above, the client server system according to the invention and its devices make it possible to facilitate observance of secrecy of information representative of a user's access authority.

What is claimed is:

1. A client server system, comprising:
   a server device;
   a client device connected to the server device; and
   an authentication device connected to the server device; wherein
   an encryption key for encryption of data and a decryption key for decryption of the encrypted data are set to the server device;
   authentication information is set to the client device or a user thereof, the authentication information to be used for authentication of access authority to the server device when jobs are demanded of the server device;
   the client device uses the encryption key to encrypt authentication information for the server device and uses the encrypted authentication information to demand a predetermined job of the server device;
   the server device receives a demand for the predetermined job from the client device, the demand including the encrypted authentication information;
   the server device forwards the encrypted authentication information to the authentication device to demand authentication for the client device or the user, of the authentication device;
   the authentication device receives demand of authentication from the server device along with the encrypted authentication information, decrypts the encrypted authentication information by using the decryption key, authenticates the client device or the user on the basis of the decrypted authentication information, and returns a result of authentication for the client device or the user to the server device; and
   the server device executes the predetermined job which is demanded from the client device or the user when access authority has been authenticated by the authentication device.

2. The client server system according to claim 1, wherein
   the client device encrypts validity information by using the encryption key, the validity information used for confirmation of the authentication information and validity of the authentication information;

the client device demands the predetermined job of the server device by using the encrypted authentication information and the encrypted validity information;

the server device uses the encrypted authentication information and the encrypted validity information contained in the demand for the predetermined jobs to demand authentication from the client device of the authentication device;

the server device forwards the encrypted authentication information and the encrypted validity information to the authentication device to demand authentication for the client device or the user, of the authentication device;

the authentication device receives a demand of authentication from the server device along with the encrypted authentication information and the encrypted validity information, decrypts the encrypted authentication information and the encrypted validity information by using the decryption key, authenticates validity of the decrypted authentication information by using the decrypted validity information, authenticates the client device or the user on the basis of the authentication information whose validity is confirmed, and returns a result of authentication for the client device or the user to the server device; and the server device executes the predetermined job which is demanded from the client device or the user authenticated by the authentication device.

3. The client server system according to claim 1, wherein the predetermined job includes a hash value of job content information indicative of contents of the job; and the authentication device implements authentication with the use of the hash value.

4. The client server system according to claim 2, wherein the validity information includes information indicative of effective terms and effective ranges, or either of the both of the authentication information.

5. A server device in a client server system, wherein the client server system includes a client device connected to the server device and an authentication device connected to the server device; and authentication information is set to the client device or a user thereof, the authentication information to be used for authentication when jobs are demanded of the server device; the server device comprising:

a receive/transmit section; and a job execution section for executing a job;

wherein the receive/transmit section receives a demand for a predetermined job from the client device, the demand including an encrypted authentication information to be used for authentication of access authority to the server device encrypted by the client device with the encryption key;

the receive/transmit section forwards the encrypted authentication information to the authentication device to demand authentication for the client device or the user, of the authentication device;

the receive/transmit section receives a result of authentication for the client device or the user from the authentication device, the authentication being executed by the authentication device on the basis of a decryption of the encrypted authentication information; and the job execution section executes the predetermined job which is demanded from the client device or the user when access authority has been authenticated by the authentication device.

6. A client device in a client server system, wherein the client server system includes a server device connected to the client device and an authentication device connected to the server device; and authentication information is set to the client device or a user thereof, the authentication information to be used for authentication when jobs are demanded of the server device; the client device comprising:

a job producing section for producing a job;

an encryption section; and a transmission section;

wherein the encryption section encrypts the authentication information to be used for authentication of access authority to the server device along with validity information, the validity information being used for confirming validity of the authentication information; and the transmission section transmits to the server device a demand for the job along with the encrypted authentication information and the encrypted validity information.

7. The client device according to claim 6, wherein the job includes a hash value of job content information indicative of contents of the job, the hash value to be used for an authentication by the authentication device.

8. A processing method in a client server system, wherein the client server system includes a server device, a client device connected to the server device, and an authentication device connected to the server device; an encryption key for encryption of data and a decryption key for decryption of the encrypted data are set to the server device; and authentication information is set to the client device or a user thereof, the authentication information to be used for authentication when jobs are demanded of the server device; the method comprising:

encrypting authentication information to be used for authentication of access authority to the server device with the encryption key in the server device;

transmitting a demand for a predetermined job from the client device to the server device, the demand including an encrypted authentication information;

forwarding the encrypted authentication information from the server device to the authentication device to demand authentication for the client device or the user, of the authentication device;

decrypting the encrypted authentication information with the decryption key in the authentication device;

authenticating the client device or the user on the basis of the decrypted authentication information in the authentication device; and returning a result of authentication for the client device or the user from the authentication device to the server device when access authority has been authenticated.

9. An authentication method in an authentication device, the authentication device connected to a server device, the server device for executing a predetermined job demanded from a client device when the client device or user thereof is authenticated by the authentication device; the method comprising:

receiving a demand from the server device for authentication for the client device or the user along with an encrypted authentication information to be used for authentication of access authority to the server device, the encrypted authentication information being encrypted by the client device and forwarded by the server device;

decrypting the encrypted authentication information with a decryption key;

authenticating the client device or the user on the basis of the decrypted authentication information; and returning a result of authentication for the client device or the user to the server device when access authority has been authenticated.

10. A processing method in a server device, wherein the server device is connected to a client device and a server device; an encryption key for encryption of data and a decryption key for decryption of the encrypted data are set to the server device; and authentication information is set to the client device or a user thereof; the method comprising:

receiving a demand for a predetermined job from the client device, the demand including an encrypted authentication information to be used for authentication of access authority to the server device, the encrypted authentication information being produced by the client device by encrypting the authentication information with the encryption key;

forwarding the encrypted authentication information to the authentication device to demand authentication for the client device or the user, of the authentication device; and receiving a result of authentication for the client device or the user from the authentication device, the authentication being executed by the authentication device on the basis of a decryption of the encrypted authentication information; and executing the predetermined job which is demanded from the client device or the user authenticated by the authentication device when access authority has been authenticated.

11. A recording medium for storing a program executed in a client server system, wherein the client server system includes a server device, a client device connected to the server device, and an authentication device connected to the server device; an encryption key for encryption of data and a decryption key for decryption of the encrypted data are set to the server device; and authentication information is set to the client device or a user thereof, the authentication information to be used for authentication when jobs are demanded of the server device;

the program causing the client server system to execute:

encrypting authentication information to be used for authentication of access authority to the server device with the encryption key in the server device;

transmitting a demand for a predetermined job from the client device to the server device, the demand including an encrypted authentication information;

forwarding the encrypted authentication information from the server device to the authentication device to demand authentication for the client device or the user, of the authentication device;

decrypting the encrypted authentication information with the decryption key in the authentication device;

authenticating the client device or the user on the basis of the decrypted authentication information in the authentication device; and returning a result of authentication for the client device or the user from the authentication device to the server device.

12. A recording medium for storing a program to be executed in an authentication device, the authentication device connected to a server device, the server device for executing a predetermined job demanded from a client device when the client device or user thereof is authenticated by the authentication device; the program causing the authentication device to execute:

receiving a demand from the server device for authentication for the client device or the user along with an encrypted authentication information to be used for authentication of access authority to the server device, the encrypted authentication information being encrypted by the client device and forwarded by the server device;

decrypting the encrypted authentication information with a decryption key; authenticating the client device or the user on the basis of the decrypted authentication information; and returning a result of authentication for the client device or the user to the server device.

13. A recording medium for storing a program to be executed in a server device, wherein the server device is connected to a client device and a server device; an encryption key for encryption of data and a decryption key for decryption of the encrypted data are set to the server device; and authentication information is set to the client device or a user thereof; the program causing the computer to execute:

receiving a demand for a predetermined job from the client device, the demand including an encrypted authentication information to be used for authentication of access authority to the server device, the encrypted authentication information being produced by the client device by encrypting the authentication information with the encryption key;

forwarding the encrypted authentication information to the authentication device to demand authentication for the client device or the user, of the authentication device; and receiving a result of authentication for the client device or the user from the authentication device, the authentication being executed by the authentication device on the basis of a decryption of the encrypted authentication information; and executing the predetermined job which is demanded from the client device or the user authenticated by the authentication device when access authority has been authenticated.

* * * * *